United States Patent
Landvik et al.

(10) Patent No.: US 6,733,083 B1
(45) Date of Patent: May 11, 2004

(54) SEAT, ESPECIALLY FOR A VEHICLE

(75) Inventors: Dag Landvik, Saltsjö-Boo (SE); Aage Kristiansen, Särö (SE)

(73) Assignee: Dan-Foam A/S, Aarup (DK)

( * ) Notice: Subject to any disclaimer, the term of this patent is extended or adjusted under 35 U.S.C. 154(b) by 0 days.

(21) Appl. No.: 09/623,587

(22) PCT Filed: Feb. 22, 1999

(86) PCT No.: PCT/SE99/00239

§ 371 (c)(1),
(2), (4) Date: Nov. 16, 2000

(87) PCT Pub. No.: WO99/44856

PCT Pub. Date: Sep. 10, 1999

(30) Foreign Application Priority Data

Mar. 3, 1998 (SE) ................................................. 9800673

(51) Int. Cl.$^7$ .............................. A47C 7/02; B60N 2/42
(52) U.S. Cl. ......................... 297/452.26; 297/452.37; 297/DIG. 1; 297/216.1; 297/452.35
(58) Field of Search ........................ 297/452.21, 452.26, 297/452.27, 452.28, 452.37, 452.29, DIG. 1, 216.1, 452.35

(56) References Cited

U.S. PATENT DOCUMENTS

| | | | |
|---|---|---|---|
| 3,880,780 A | * | 4/1975 | Ridenour et al. ........ 521/160 X |
| 4,338,407 A | * | 7/1982 | Chandalia et al. ............ 521/99 |
| 5,252,270 A | | 10/1993 | Haardt et al. |
| 5,272,001 A | | 12/1993 | Weisman |
| 5,290,091 A | | 3/1994 | Dellanno et al. |
| 5,418,257 A | | 5/1995 | Weisman |
| 5,580,124 A | | 12/1996 | Dellanno |
| 5,788,185 A | * | 8/1998 | Hooper ..................... 297/216.1 |

FOREIGN PATENT DOCUMENTS

| | | |
|---|---|---|
| EP | 0492201 A2 | 7/1992 |
| EP | 0718144 A1 | 6/1996 |
| JP | 22866481 | 11/1990 |
| WO | WO 9412080 A1 | 6/1994 |
| WO | WO 9743142 A1 | 11/1997 |

OTHER PUBLICATIONS

"Encyclopaedia of Polymers", "Soviet Encyclopaedia" Publishing House, Moscow, 1974, vol. 2, columns 573–574.

"Foam Plastics", Collected Articles, edited by A.A. Moiseyev et al., Oborongiz State Scientific–and–Technical Publishing House, Moscow, 1960, pp. 128–130.

* cited by examiner

*Primary Examiner*—Anthony D. Barfield
(74) *Attorney, Agent, or Firm*—Young & Thompson

(57) ABSTRACT

A vehicle seat includes a cellular plastic layer adjacent to the body of a user. The cellular plastic layer is a layer of a substantially energy absorbing cellular plastic having a density of 30–110 kg/m$^3$, an ILD at 65% indentation of 100–500 N, and a rebound of maximum 10%.

2 Claims, 4 Drawing Sheets

SEAT, ESPECIALLY FOR A VEHICLE

TECHNICAL FIELD

The present invention relates to a vehicle seat, such as a car seat.

PRIOR ART

The predominant method for the manufacture of vehicle seats is to cast the seat together with optional inserts made of steel etc., in one and the same material, usually foamed polyether cellular plastic. The seat cushion should be comfortable, while the sides which are supposed support the thighs shall be somewhat harder. This is achieved by foaming, in the same mould, with different indexes, i.e. different amounts of isocyanate are used. More isocyanate gives a harder cellular plastic. Such a foam material does not absorb any energy, but instead results in a quick spring back.

As part of the personal protection in modern cars the seats, especially the front seats, are made stiffer in order not to break in an accident. This type of seats give a better protection at higher speeds, but they work less good at low speeds. Because of the stiffness, the seat will not absorb energy at for example a rear-end collision at low speed, but instead the body and especially the head will bounce back and forward resulting in so called whip-lash injuries in the vertebral column. The insurance companies have established that the number of injuries increases every year, and in Sweden now about 16,000 injuries are reported each year, and about 2,000 of these lead to invalidity.

THE INVENTION

The object of the present invention is to provide a vehicle seat having energy absorbing characteristics which compared to the prior art exhibits enhanced protection against whip-lash injuries at rear-end collisions.

This and other objects of the invention are achieved with the vehicle seat according to the invention.

SHORT DESCRIPTION OF THE INVENTION

Figure 1:
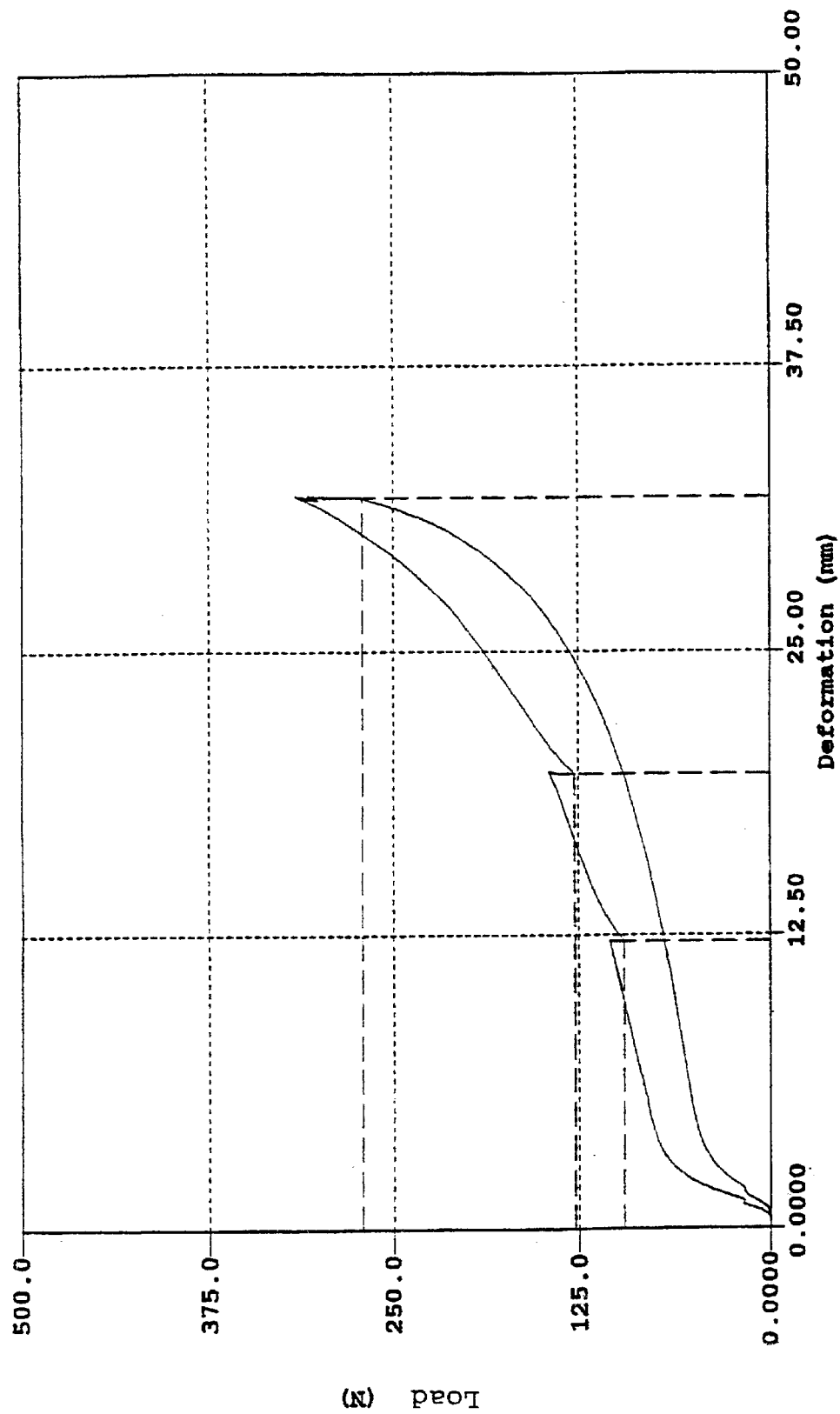
Figure 2:
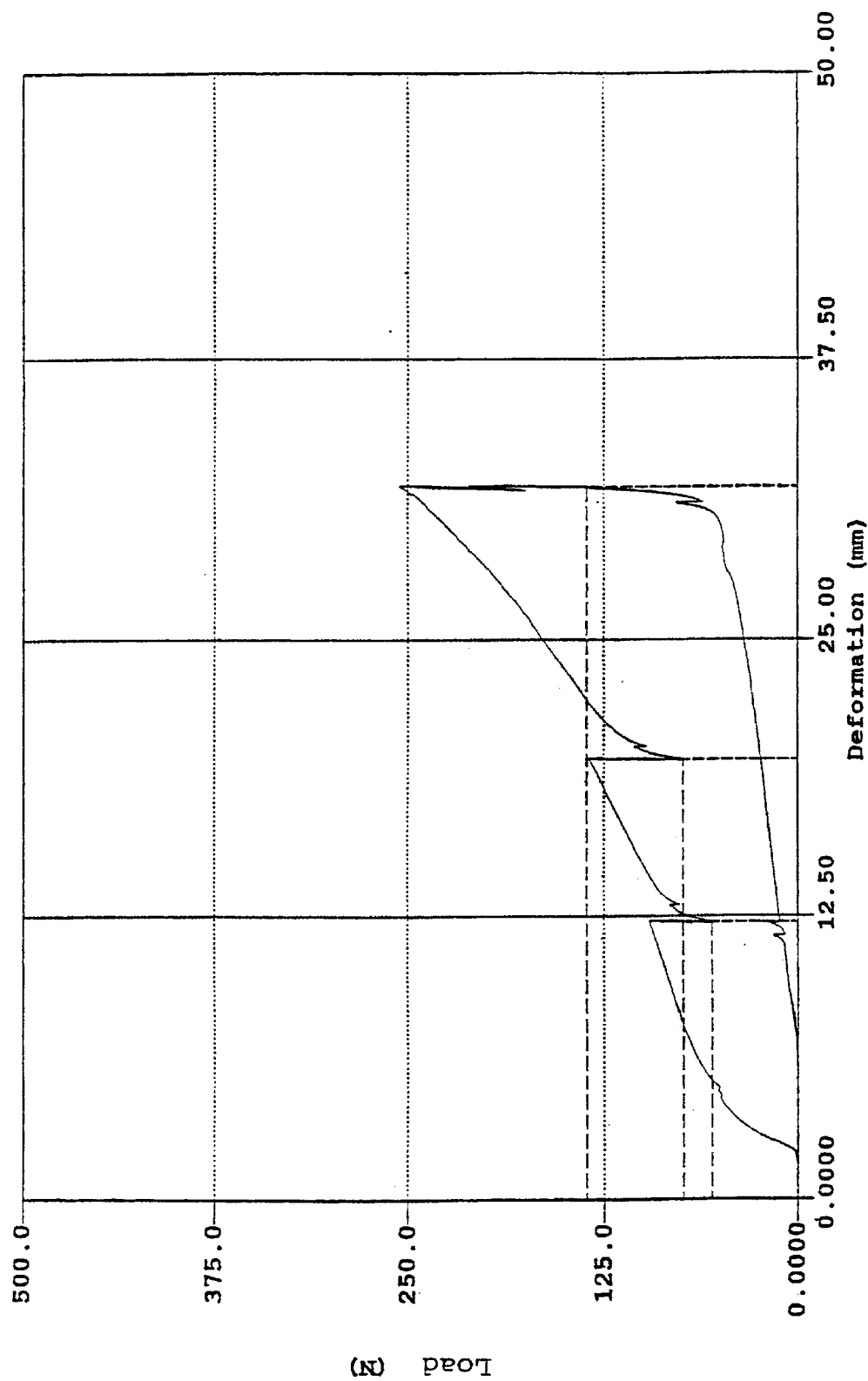
Figure 3:
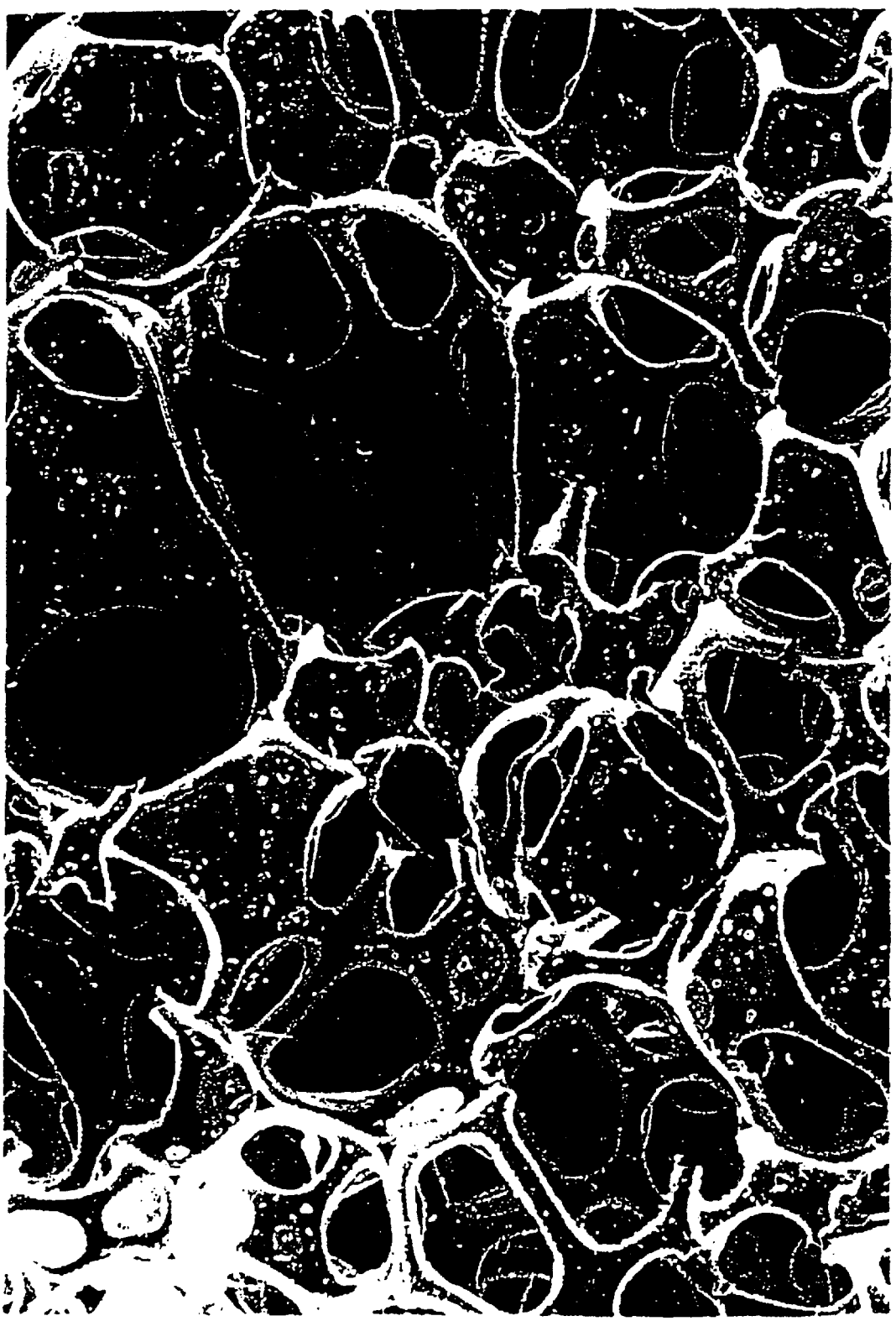
Figure 4:
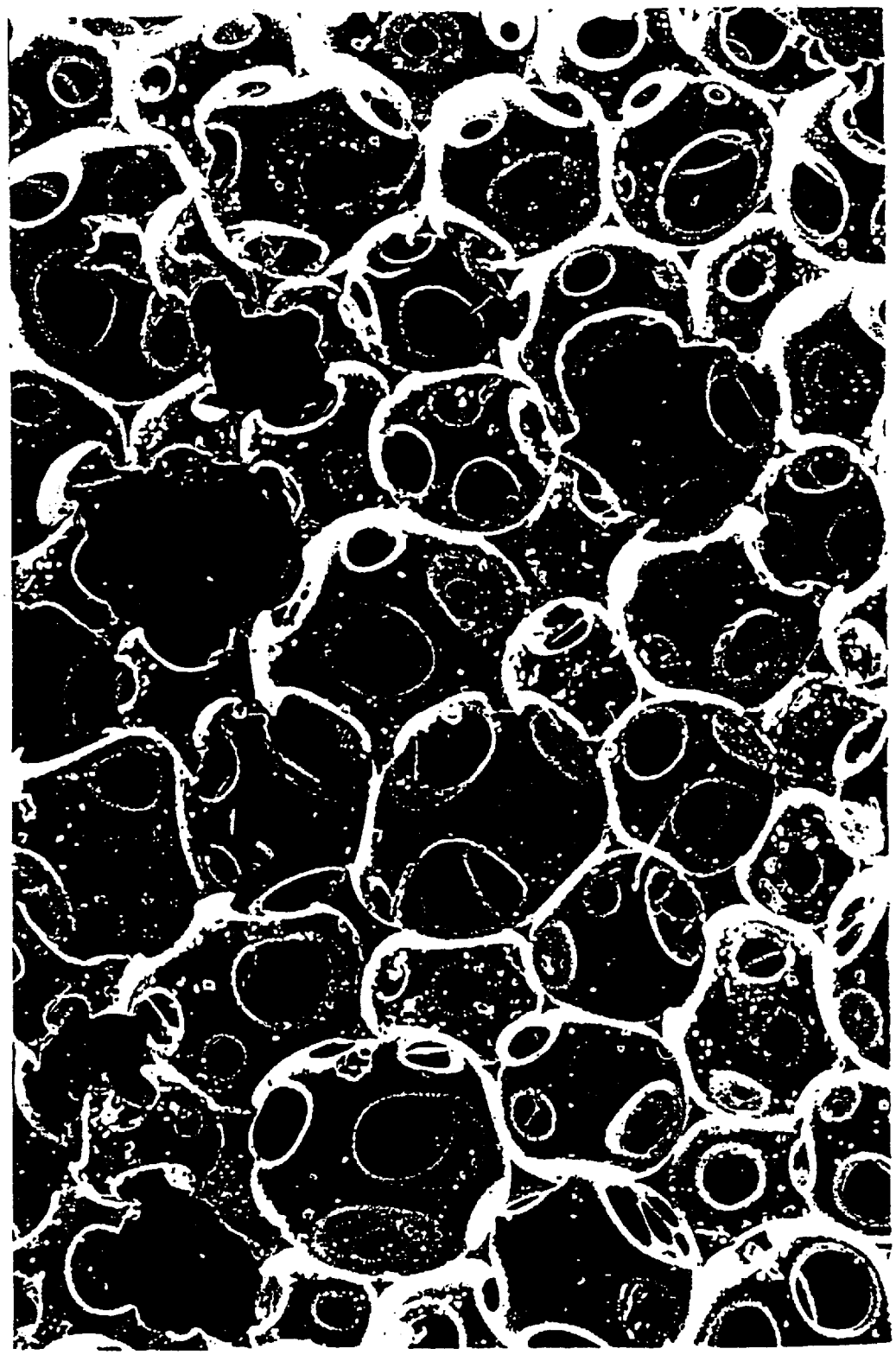

Further objects, advantages and features of the invention will be obvious from the following detailed description of preferred embodiments of the invention with reference to the accompanying drawings, in which FIG. 1 illustrates an energy absorption graph for highly elastic cellular plastic usually used in furniture, FIG. 2 illustrates a corresponding graph for a substantially energy absorbing cellular plastic, FIG. 3 illustrates the structure of a highly elastic cellular plastic, and FIG. 4 illustrates the structure of a substantially energy absorbing cellular plastic of the kind used in the vehicle seat according to the invention.

DESCRIPTION OF PREFERRED EMBODIMENTS OF THE INVENTION

Behind the invention lies the fact that the glass transition temperature GTT for energy absorbing cellular plastic, behaves entirely different compared to what is the case with other, relatively more elastic cellular plastics. The last mentioned cellular plastics have a large viscosity change over a small temperature interval, while the viscosity change for an energy absorbing cellular plastic, e.g. a polyurethane polymer, has a much wider temperature interval, wherein the polymer softens slowly. Thus for example a seat with energy absorbing cellular plastic can be felt hard at 0° C., but when seated on such a seat it can be felt that you sink into it successively when the cellular plastic is gradually warmed up by the seated person.

A layer of energy absorbing cellular plastic adjacent to the body absorbs and moderates the energy which is brought to the body at a collision at low speed.

Energy absorbing cellular plastics are known per se within the area of plastics material and the characteristics of such cellular plastics are usually summarized among experts as being visco-elastics, non-elastics, controlled recovery, memory foam etc. The characteristics of the cellular plastic result in that it after indentation of one body or the other recovers slowly, which means that indentation marks can be studied for a longer or shorter time. The energy absorption can also be studied in a standard test, wherein a steel ball falls against the cellular plastic surface. A maximally energy absorbing cellular plastic gives a rebound of less than 2% of the drop height, while a so called highly elastic cellular plastic for furniture shall have a rebound of about 60%. The energy absorption can also be studied graphically when the indentation hardness is measured according to ASTM-D-1564.

Thus, in FIG. 1, a graph is shown for a highly elastic cellular plastic having a thickness of 50 mm and an ILD (Indentation Load Deflection) at 65% indentation of more than 400 N. The surface between the load curve A and the unloading curve B is a measure of the energy absorption, and, as is evident from the Figure, this is negligible.

In FIG. 2 the corresponding graph is shown for a substantially energy absorbing cellular plastic having the same thickness, that is 50 mm, with an ILD at 65% of about 250 N. The indentation has in the illustrated example taken place in three steps, but it is clearly seen that the energy absorption is substantial and this clearly shows the existing possibility of satisfactorily absorbing the energy which in a conventional car seat at rear-end collisions causes the above discussed whip-lash injuries. The wording "substantially energy-absorbing cellular plastic" is used in this context in order to distinguish the kind of cellular plastic which is used in the vehicle seat according to the present invention and which is exemplified in FIG. 2 from that kind of highly elastic cellular plastic which at present is used in e.g. car seats and furniture and which is exemplified in FIG. 1.

The comfort of a car seat is given partly by the characteristics and the design of the seat itself, partly by the characteristics and form of the backrest and the headrest. From a traffic safety point of view, the function and comfort of all parts of the car seat are of highest importance. When it comes to reducing the risk of injuries at rear-end collisions both the backrest and the head rest of the seat have a decisive importance. By arranging the energy absorbing cellular plastic layer in the vehicle seat adjacent to the body of a user, the main part of the energy emitted in the collision is absorbed by the cellular plastic layer.

A suitable density for such an energy absorbing cellular plastic is 30–110 kg/m$^3$ and an ILD at 65% indentation of 100–500 N, and a rebound of maximum 10% according to the ASTM-D-1564 standard. In this standard, a steel ball with a diameter of 15.9 mm and a weight of 16.3 g is released from a height of 457 mm. The rebound is read, and a mean value of 5 tests is taken, expressed as a percentage of the initial height from which the ball is released. The material under test was stabilized for at least 72 hours after manufacture.

A suitable thickness of the energy absorbing cellular plastic layer is about 50 mm, but of course it can be made both thinner and thicker without moving away from the inventive thought. The cellular plastic layer should however be at least 20 mm thick in order to give the desired effect.

A formulation for an energy absorbing cellular plastic is one or several miscible or non-miscible polyols, water or $CO_2$ as blowing agent, an amine as catalyst, a organometallic compound as gelling catalyst, together with additives such as stabilizer, colouring agent, filler, flame retardant and anti bacterial agent. As hardener can be used toluene diisocyanate, either T80 or T65 or a mixture of those two, or methylene diisocyanate (MDI) or a prepolymer comprising one of said isocyanates. One example of a typical formulation is: 70 parts (w/w) polyol (OH 250), 30 parts polyol (OH 50), 1,8 parts water, 0.2 parts ternary amine, 0.6 parts stabilizer (silicon oil), 0.1 parts tin octoate, 5.0 parts flame retardant, and isocyanate of varying index.

In order to further illustrate the invention, FIG. 3 illustrates the cellular structure in a highly elastic cellular plastic for furniture. This cellular plastic has a structure which can be described as an octahedron, which structure is rather prone to breakage. This structure shall be compared with the cellular structure shown in FIG. 4 for an energy absorbing cellular plastic, wherein the cells more look like balls. This cellular plastic absorbs the energy of impacts very well.

The vehicle seat according to the invention can be provided with the energy absorbing cellular plastic layer in either the seat or backrest or preferably both, as well as in the headrest. Hereby the energy absorbing cellular plastic layer is provided between the supporting part of the seat and a surface layer in the form of an upholstering, against which as user shall rest. An inner highly elastic cellular plastic layer can if desired be provided between the shell and the energy absorbing cellular plastic layer.

The provision can be made in different ways. According to one method the energy absorbing cellular plastic layer is confectioned in order to be glued on the shell in a subsequent step or if applicable on an inner, highly elastic cellular plastic layer. The energy absorbing cellular plastic layer can also in a first step, be cast in a mould, whereupon the remaining part of the shell in question is cast in the same mould. Another alternative is to vacuum dress a mould with the upholstering whereupon the energy absorbing cellular plastic layer is cast in the mould. Further the cellular plastic layer can be laminated on an upholstering which subsequently with the use of vacuum is attached to a mould for final casting of the shell in question. Alternatively the laminate of cellular plastic and upholstering can be attached on a shell in any suitable way.

Without negatively affecting the advantages obtained with the structure according to the invention a temperature insensitive material in the form of a conventional filling material such as polyurethane foam or a fibre material can be applied on the energy absorbing polyurethane foam as a comfort layer. Thereby the above discussed disadvantage that the energy absorbing polyurethane foam is hard at 0° C., is reduced or eliminated. A suitable thickness might be 20–30 mm.

What is claimed is:

1. A vehicle seat comprising a cellular plastic layer adapted to be adjacent to a body of a user when a user is in the seat, the cellular plastic layer being covered by a surface layer and being a layer of a substantially energy absorbing cellular plastic having a density of 30–110 kg/m$^3$, an ILD at 65% indentation of 100–500 N, and a rebound of maximum 10% when tested by dropping a steel ball from a height above the cellular plastic layer.

2. A vehicle seat comprising a layer of substantially energy absorbing cellular plastic having a density of 30–110 kg/m$^3$, an ILD at 65% indentation of 100–500 N, and a mean rebound maximum of 10% when tested by dropping a 16.3 gm steel ball with a diameter of 15.9 mm from a height of 457 mm onto the plastic five times, expressed as a percentage of the height from which the ball was released.

* * * * *